United States Patent [19]

Dykehouse

[11] 4,358,033
[45] Nov. 9, 1982

[54] INJECTION MOLDING ASSEMBLY

[75] Inventor: Robert H. Dykehouse, Sterling Heights, Mich.

[73] Assignee: Export Tool Company, Toronto, Canada

[21] Appl. No.: 146,689

[22] Filed: May 5, 1980

[51] Int. Cl.³ .............................................. B29F 1/04
[52] U.S. Cl. .................................. 222/509; 222/413; 222/559; 425/542; 425/564
[58] Field of Search ...................... 425/563, 564, 542; 222/252, 509, 559, 372, 413; 215/63.4

[56] References Cited

U.S. PATENT DOCUMENTS

| | | | |
|---|---|---|---|
| 2,359,840 | 10/1944 | Goessling | |
| 3,191,233 | 6/1965 | Linderoth, Jr. | |
| 3,398,435 | 8/1968 | Nouel | 425/563 X |
| 3,642,403 | 2/1972 | Havlik | 425/563 X |
| 4,076,485 | 2/1978 | Sokolow | 425/563 X |

FOREIGN PATENT DOCUMENTS 1118692  7/1968  United Kingdom ................ 425/564

*Primary Examiner*—David A. Scherbel
*Attorney, Agent, or Firm*—Basile, Weintraub & Hanlon

[57] ABSTRACT

A injection molding nozzle with an automatic shut-off valve is disclosed. The present invention is intended for use with injection molding machines employing a screw plasticizer and an injection plunger. The nozzle, as a conversion unit, fits any in-line screw injection machine. The nozzle can, also, be employed as part of a two-stage injection molding machine capable of injection molding, conventional, semi-foam or structural foam. The nozzle of the present invention has smooth flow passages and a few parts which are of simple construction allowing the nozzle to be easily cleaned for conversion to different materials.

6 Claims, 7 Drawing Figures

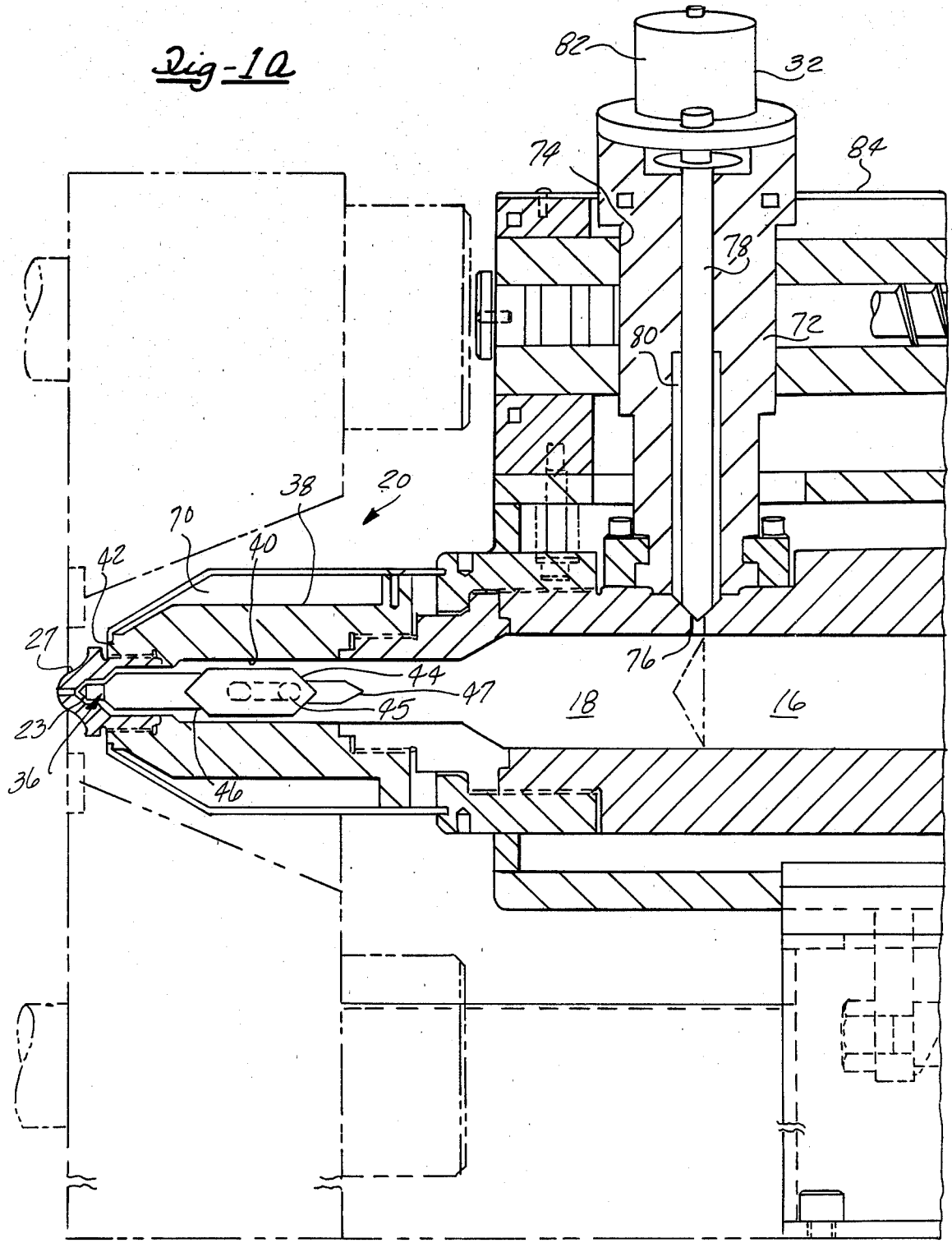

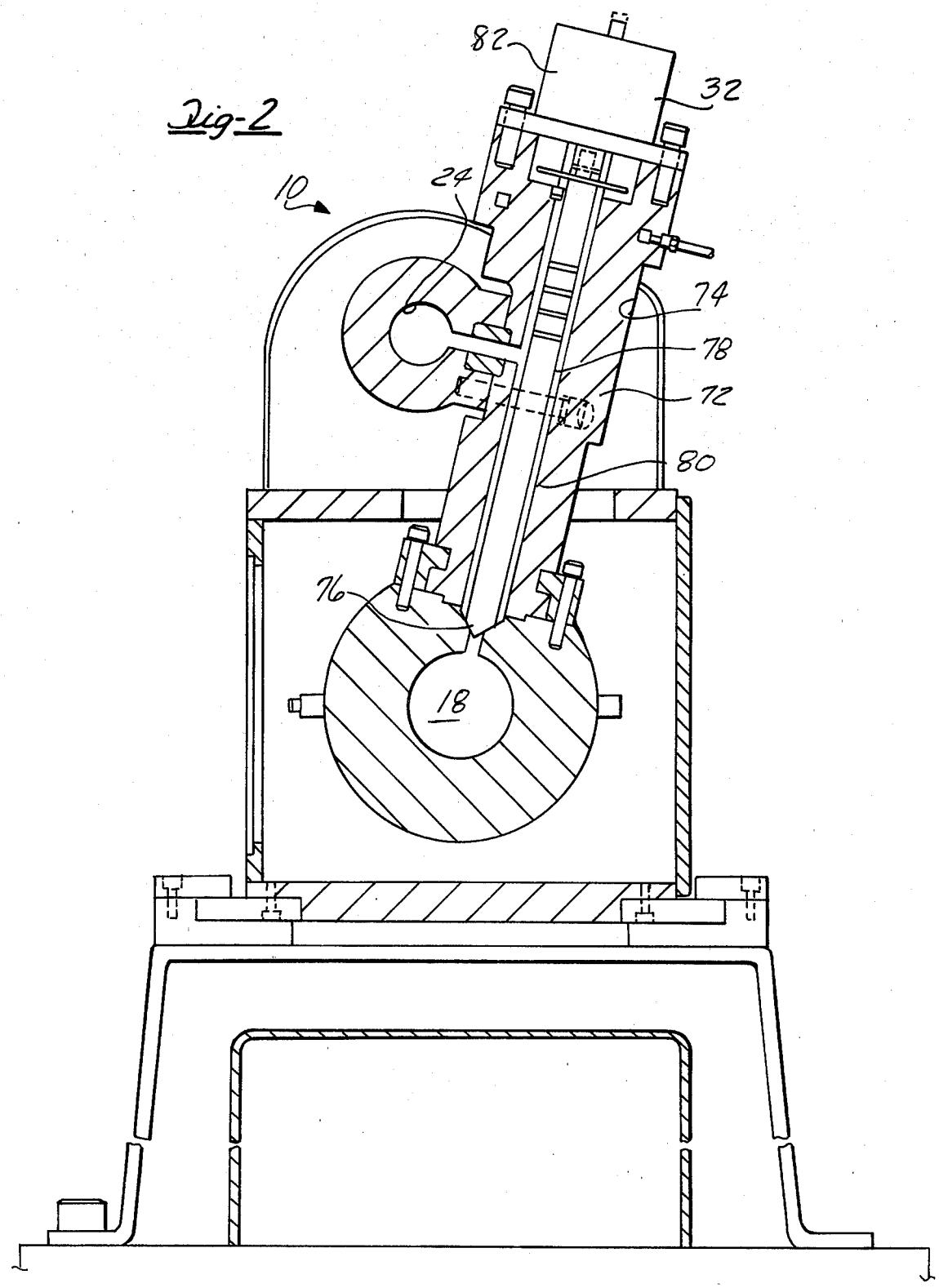

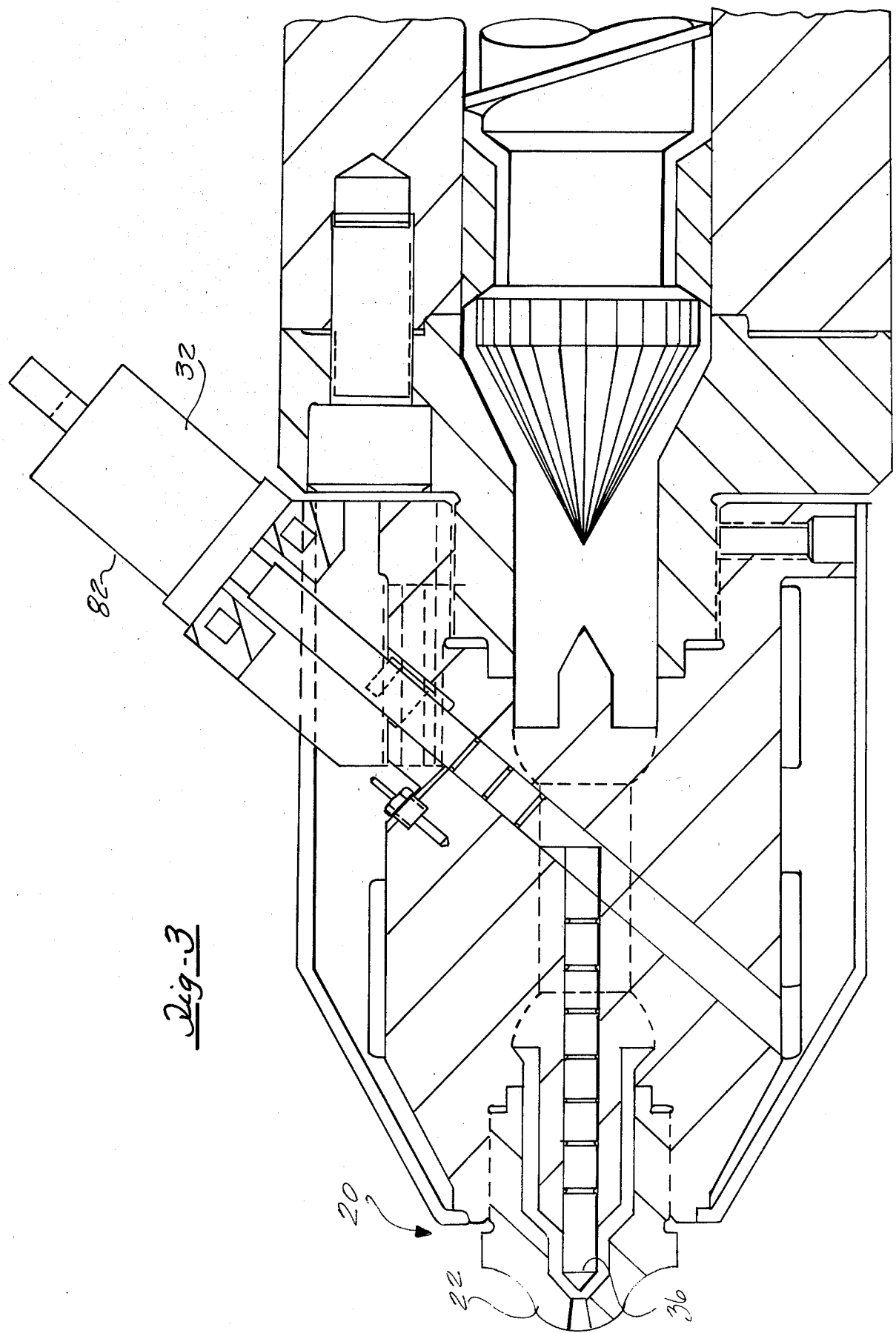

INJECTION MOLDING ASSEMBLY

BACKGROUND OF THE INVENTION

I. Field of the Invention

The present invention relates to the field of injection molding machines. More particularly the present invention relates to the field of injection molding machines employing a screw plasticizer and an injection plunger. Even more particularly the present invention relates to the field of injection molding machines employing a screw plasticizer, and an injection plunger adapted to high or low pressure foam molding.

II. Prior Art Statement

U.S. Pat. Nos. 2,719,326 and 2,790,203 disclose an improved pre-plasticizing units for injection molding machines. U.S. Pat. No. 3,058,161 discloses a method of molding expandable thermoplastic material of the foamable thermoplastic resinous type. U.S. Pat. No. 3,780,764 discloses a combined nozzle shut-off valve and flow control valve for use in injection molding machine nozzles. None of the above listed United States Patents disclose an automatic nozzle shut-off valve which is positively closed by an actuator.

SUMMARY OF THE INVENTION

The present invention comprises an injection molding nozzle with a positively closed shut-off valve. The nozzle of the present invention is intended for use with injection molding machines employing a screw plasticizer and an injection plunger. The present invention can be employed to convert a conventional in line screw and plunger type machine to a machine capable of injection molding conventional, semi-foam or structural foam. A machine employing the nozzle of this invention is capable of accomplishing high or low pressure foam molding. The present invention uses smooth flow passages which are easily cleaned for converting machines to using a plastic of different composition or color.

The injection molding nozzle with shut-off valve of the present invention comprises a body or housing mounted onto an injection molding machine. The body or housing has a central bore with an inner end and an outer end; the inner end communicates with the injection chamber of the molding machine, while the outer end is threadably connected to a nozzle tip. The nozzle tip has a bore which communicates with the central bore of the housing. A plunger support is stationarily mounted in the central bore and has portions of the outer periphery thereof removed to allow plasticized plastic to flow therepast. The support has a longitudinal bore which is concentric with the housing bore. A plunger or spool is slidingly supported within the plunger support bore. The plunger has a conical outer end to selectively engage the body bore and a flat inner end.

An actuator plunger or wedge lock is mounted on the housing and passes through the plunger support at the inner end thereof. The actuator plunger is angled to abut the plunger inner end. An included angle between the axis of the plunger and the actuator plunger is between 100 degrees and 170 degrees. The actuator plunger is slidably supported in the housing within an angular bore formed therein which communicates with an angular bore formed in the plunger support.

A fluid operated cylinder is affixed to an outer end of the actuator plunger. The cylinder moves the actuator plunger from a first position wherein the plunger outer end engages and closes the nozzle tip bore, to a second position wherein the nozzle tip bore is opened and is in communication with the mold to permit plastic to flow thereinto, to positively hold the plunger in the bore.

The nozzle is positively held shut by the actuator plunger or wedge lock until an efficient pressure and temperature is raised in the injection chamber to efficiently and effectively inject the plastic into the mold. Also the plastic charge is held in the injection chamber under pressure to allow the charge to be properly plasticized and raised to the desired foaming temperature before being injected into the mold. Holding the charge in the chamber under pressure prevents premature foaming and a resultant uneven density in the finished part.

When a chemical blowing agent is used, it is commonly mixed with the plastic in powder form at the entrance end of the screw. The plastic foams due to expanding gas released by the blowing agent as the plastic emerges from the injection nozzle and enters the mold. The present invention works equally well with chemical blowing agents, as described above, and with high pressure gas blowing agents such as nitrogen. In a high pressure nitrogen gas blowing system the gas is introduced under pressure at the nozzle. As the plastic and gas are discharged into the mold cavity, the gas is dispersed uniformly about the structure of the molded part. The nozzle of the present invention allows the injected plastic to be under pressure when injection begins thus assuring an even and efficient distribution of the gas through out the plastic when a high pressure gas blowing system is used.

For a more complete understanding of the present invention, reference is made to the following detailed description and accompanying drawings.

Other objects, advantages, and applications of the present invention will become apparent to those skilled in the field to which this invention pertains when the accompanying description of the best modes contemplated for practicing the invention are read in conjunction with the accompanying drawings.

BRIEF DESCRIPTION OF THE DRAWINGS

In the drawings, like reference numbers refer to like parts throughout the several views, and wherein:

FIG. 1a is a cross-sectional view of the nozzle shut-off valve assembly and vertical shut-off valve assembly hereof;

FIG. 1b illustrates a cross-sectional view of the injection chamber and plunger of the present invention;

FIG. 2 is a cross-sectional view of the vertical shut-off valve taken along line 2—2 of FIG. 1; and FIG. 3 is a cross-sectional view of the plunger and wedge lock.

DESCRIPTION OF THE PREFERRED EMBODIMENT

Figure 1:
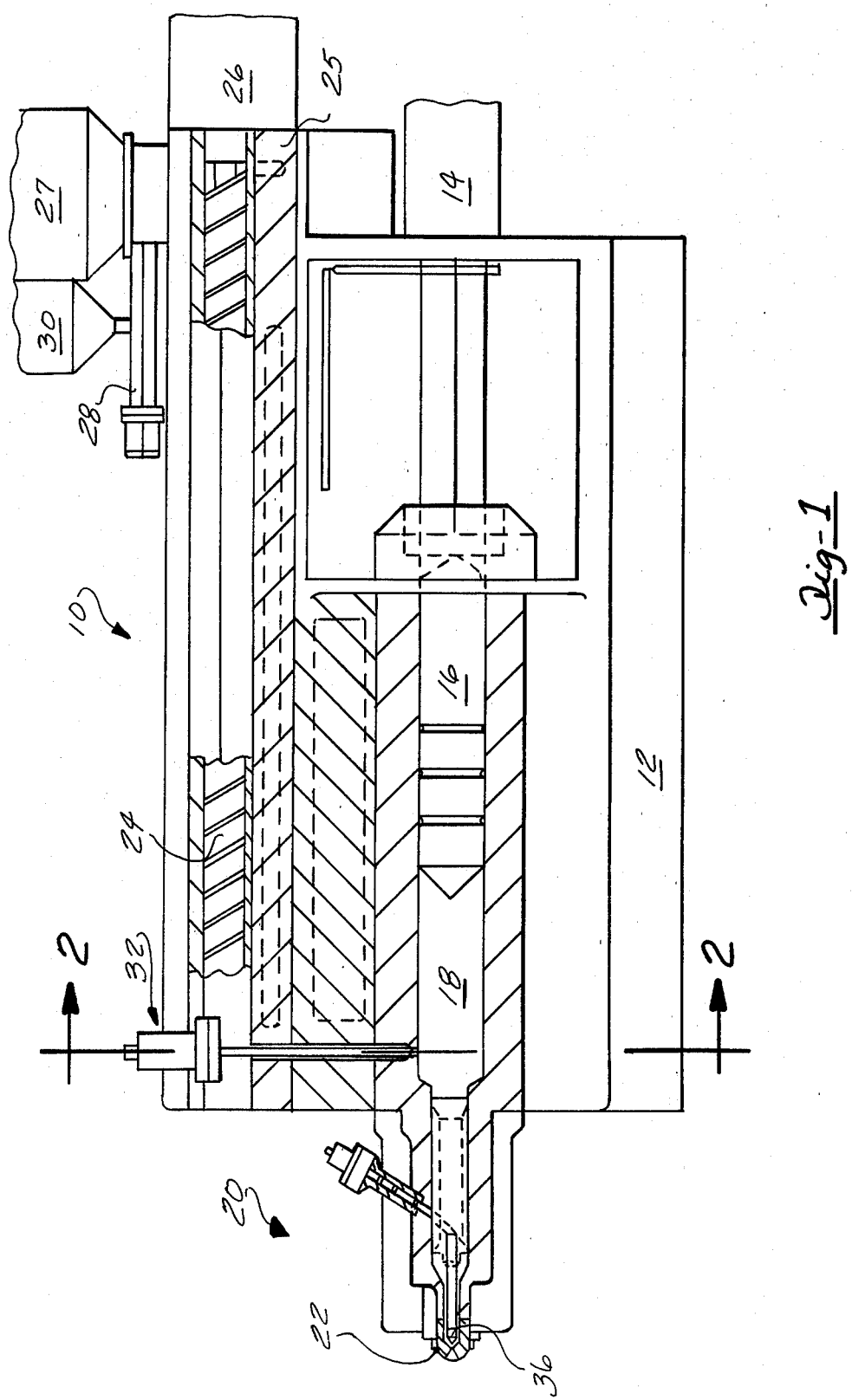
FIG. 1 illustrates an injection molding unit including the injection molding nozzle and vertical shut-off valve of the present invention.
Figure 16:
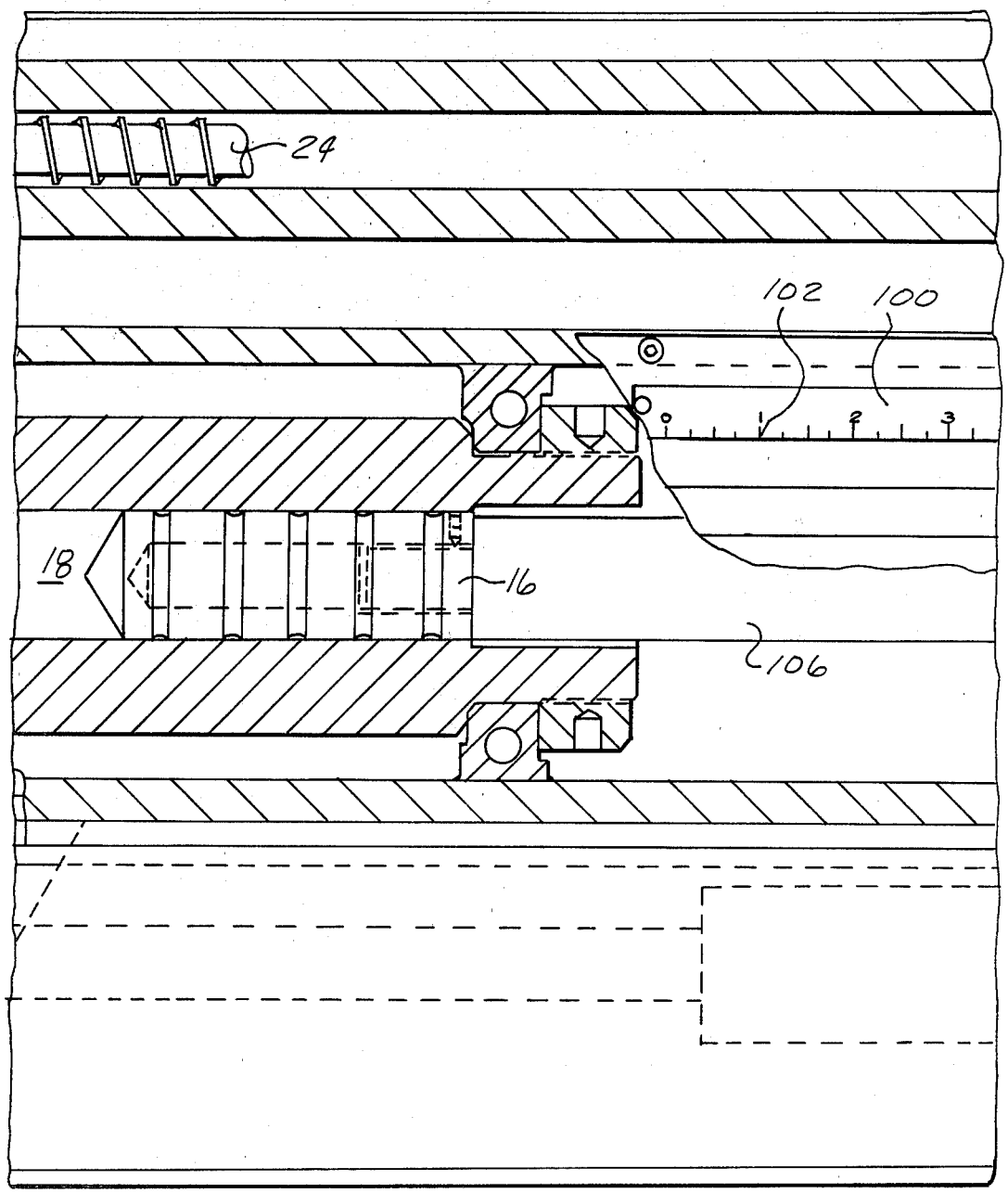

Referring now to the drawings and in particular to FIG. 1 wherein there is illustrated at 10 an injection molding unit employing the nozzle of the present invention. The injection molding unit 10 comprises a base 12 to which there is mounted an injection cylinder 14. The injection cylinder 14 displaces an injection rod 16 into an injection chamber 18 which displaces plastic into an injection nozzle 20 directing a plasticized plastic into a tip 22 where the plastic is injected into the mold. A plasticizing screw 24 is rotatably driven by an hydraulic motor 26 mounted on top of the injection cylinder and injection chamber. A plastic hopper 27 introduces plastic in powdered form into a low pressure end of a plasticizing screw 24. A clean out chamber 25 is provided at the low pressure end to aid in cleaning the screw inlet. A blowing agent screw 28 introduces blowing agent from a blowing agent hopper 30 into the plastic hopper 27 in the proper ratio of plastic to blowing agent to give optimum foaming characteristics. The plasticizing screw 24 forces the plastic and blowing agent mixture to the high pressure end of the plasticizing screw where a valve 32 selectively controls the introduction of the plastic and blowing agent mixture into the injection chamber 18.

As the injection cylinder 14 withdraws the injection rod 16 from the injection chamber 18, the valve 32 opens allowing a charge of plastic to enter the injection chamber 18.

A nozzle 20 includes a nozzle shut off spool 36 which prevents plastic from entering the tip 22 when the injection chamber 18 is below a predetermined pressure. To begin the cycle, the injection cylinder 14 withdraws the injection rod 16 to a predetermined point so that a measured amount of plastic is allowed to enter the injection chamber 18. A heating jacket (not shown) surrounds the injection chamber 18 to heat the charge of plastic in the injection chamber 18 and assure that the plastic and blowing agents are warmed to the proper foaming temperature. The plastic and blowing agents are held in the chamber 18 at a pressure sufficiently high to prevent premature foaming.

Once the injection chamber 18 has been filled with a charge of plastic and the valve 32 closed, the heating jacket warms and further plasticizes the charge readying it for injection into the mold.

The nozzle 20, FIG. 1a, incorporates the shut-off spool 36 to hold the charge in the injection chamber 18 under pressure until the proper conditions of temperature and pressure have been met for efficient injection of the charge into the mold through the tip 22. The nozzle 20 comprises a body 38 including a central bore 40 with an inner end open to the injection chamber 18 and a threaded outer end 42. The nozzle tip 22 threadingly engages the outer end 42. The tip includes a concentric bore 21. A plunger support 44 is supported by the central bore 40, and portions of the outer periphery of the plunger support 44 are removed to allow plasticized plastic to flow therepast. The support 44 is torpedo shaped as illustrated in FIG. 1a. In a preferred configuration the plunger support 44 has an angular bore 45 which receives the top of an actuator plunger. An inner end 47 of the support 44 is tapered to streamline the support.

The plunger support 44 has a central bore 46 which extends longitudinally and is concentric with the bore 40. The plunger or spool 36 is slidingly supported by the support central bore 46. The plunger 36 includes a double tapered conical outer end 50 to selectively engage the concentric bore 40. The included angle of the end 50 of the plunger 36 is less than an included angle of an inner wall 23 of the nozzle 22 to facilitate sealing and cleaning of the nozzle. As shown in FIG. 3, the plunger 36 further includes a flat inner end 52 which abuts an angled inner end 54 of the actuator plunger 56. The actuator plunger or wedge lock 56 is adapted to pass through the plunger support 44 at the inner end thereof through bore 45. The included angle between the actuator plunger 56 axis and the plunger 36 axis is greater than 100 degrees but less than 170 degrees. The actuator plunger 56 is slidingly supported in a plunger bore 58 formed through a wall of the body or housing 38. A linear actuator 60, such as a fluid-operated cylinder is affixed to the outer end of the actuator plunger 56 to move the actuator plunger 56 from a first position wherein the plunger 36 outer end engages and closes the concentric bore 21 at the nozzle tip 22 to a second position wherein the outer end of the plunger 36 is moved inward to open the concentric bore 21. The actuator 60 is threadingly a mounted to the housing 38.

As shown in FIG. 1, a metallic shield 70 surrounds the nozzle 20 to retain heat therein and prevent chilling of the plastic as it passes through the nozzle. Because of the difference in angle between the tip of the spool 36 and the wall 23 of the bore 40 proximate the nozzle tip 22, the spool having a lesser angle than the wall, the spool tip is pinched against the wall. This creates a more effective seal upon closure and when retracted, the flow therepast of material keeps the tip of the spool clean.

The valve 32 keeps material from going into the screw 24 during injection and locks material in the injection chamber 18. This is achieved by overspinning the screw 24. The valve 32 (FIGS. 1a and 2) comprises a valve body 72 mounted in a valve body bore 74 which is in communication with a high pressure end of the plasticizer screw 24. The bore 74 terminates at its inner end in a reduced diameter opening 76 which communicates with the injection chamber 18. A valve plunger 78 is slidingly supported by a valve plunger bore 80, and an outer end of the valve plunger 78 is connected to a valve actuator 82, such as a fluid-operated cylinder. An inner end of the valve plunger 78 has a conical end which selectively engages the periphery of the opening 76 to close communication between the pressure end of the plasticizing screw 24 and the injection chamber 18. The valve actuator 82 selectively moves the valve plunger 78 from a first position closing communication between the plasticizing screw 24 and the injection chamber 18. Opening the communication between the plasticizing screw 24 and the injection chamber 18, allows the passage of plastic from the plasticizing screw 24 to the injection chamber 18. A heat shield 84 surrounds the plasticizing screw 24 and the valve 32 to retain heat therein. The valve 32 is moved to an open position to inject plastic into the injection chamber 18, and is maintained in a closed position when the plastic in the chamber 18 is being warmed prior to injection into the mold, or the injection rod 16 is being advanced into the injection chamber 18 to inject plastic into the mold.

As related hereinabove structural foam molding is accomplished in two ways: chemical blowing agent is mixed with the plastic, the blowing agent releasing gas when heated in the injection chamber and released in the mold. The gas foams the plastic when the plastic is released into the mold. In a second foaming method a high pressure gas is injected into the plastic as it leaves the nozzle to enter the mold. The high pressure gas expands and mixes with the plastic to form a foam in the mold. Either type of structural foam molding is improved by the use of the nozzle of the present invention.

When a chemical blowing agent is used the plastic is held under pressure in the injection chamber until the plastic has been properly plasticized and the premature release of gas from the plastic is prevented due to the plastic being held under pressure. When ready, the plastic is quickly and uniformly injected into the mold allowing an even distribution of cells with the molded part. Structural foam molding using a pressurized gas injected at the nozzle is improved by the use of the present invention because the plastic is quickly and uniformly injected into the mold under pressure permitting a uniform distribution of the gas within the plastic and a uniform cellular structure results.

Plastic parts of either the foamed or unfoamed type having uniform quality are more quickly produced using less energy when the nozzle of the present invention is employed. Using the present invention, the plastic is throughly plasticized and brought to a uniform consistency and is under pressure before the nozzle shut-off valve is opened. This quickly and uniformly injects the plastic into the mold, requiring about one half the energy needed by conventional systems.

Although the present invention has been described with reference to a two-stage injection system, the nozzle assembly including the wedge lock and its actuator can be mounted as a replacement unit onto an in-line screw injection unit.

The present two-stage unit is capable of injection molding conventional, semi-foam and structural foam. It should be noted with respect hereto that by overspinning the screw excess pressure is created in the injection chamber thereby enabling the vertical shut-off valve to operate effectively in compacting the plastic to be injected while building up kinetic energy in the injection chamber.

Figure 1C:
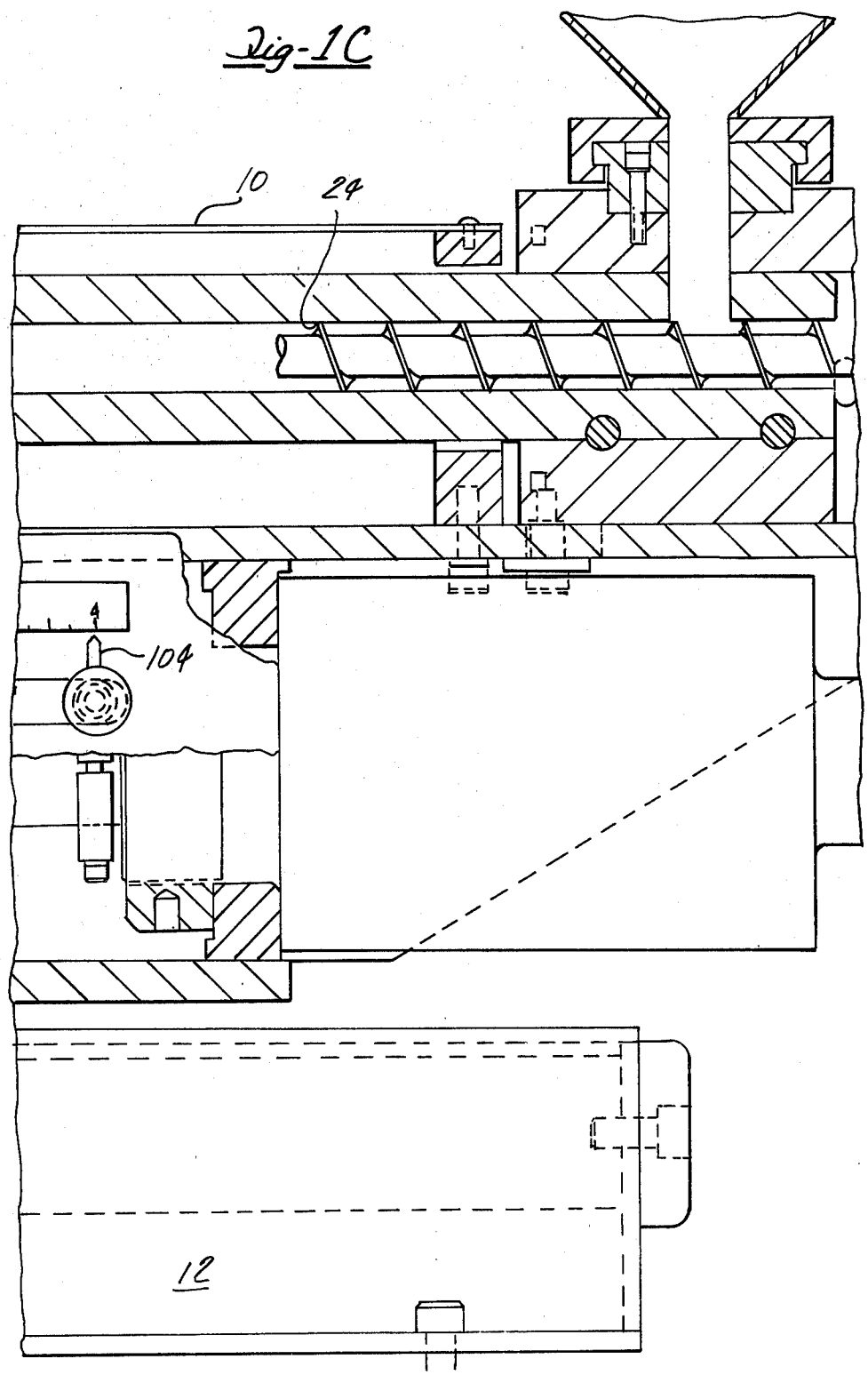
FIG. 1c illustrates a cross-sectional view of the plasticizing screw of the injection molding unit hereof.
Figure 1D:
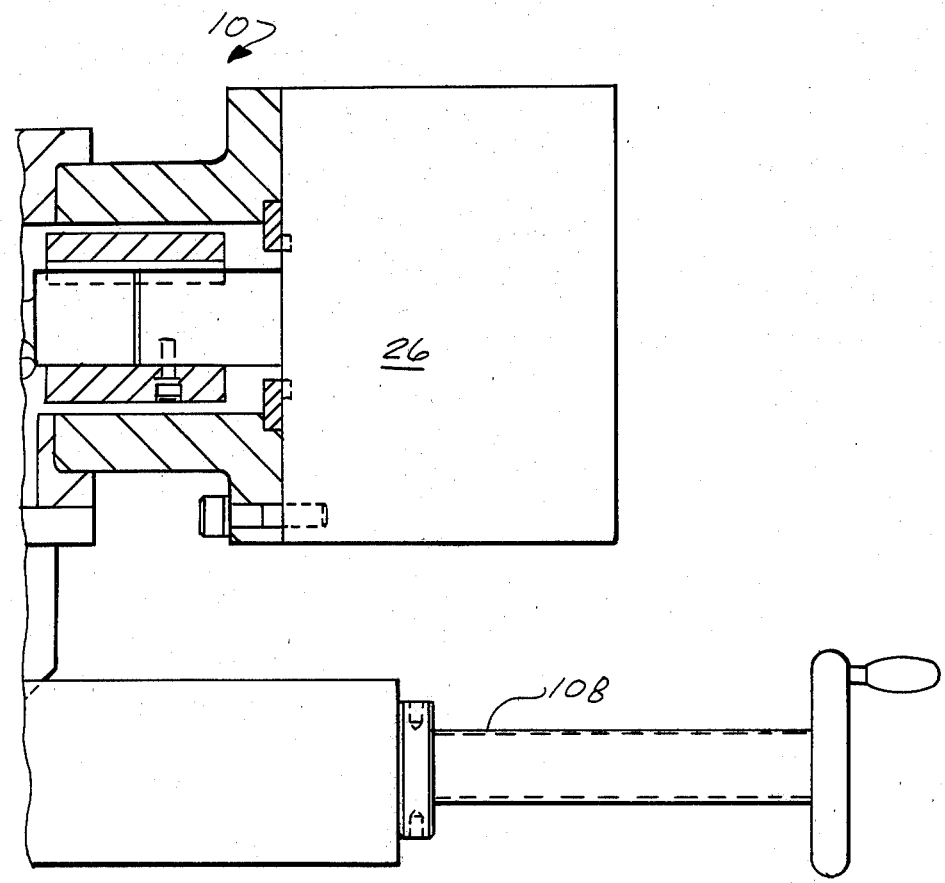
FIG. 1d illustrates the melting section hereof.

Referring to FIGS. 1b-1d there is shown the metering assembly hereof with respect to the two-stage unit. Mounted to the exterior of the unit is a gradient 100 having pound measurement 102 graded therealong. A pointer 104 is connected to the hydraulic cylinder rod 106 of the hydraulic injection cylinder and is rotatable for minute adjustments of the volumetric metering system hereof for accurate weight control of the molded parts. The tail rod controls the return stroke of the hydraulic cylinder head in the well-known manner.

In achieving accurate metering in accordance herewith, the screw 24 is started and plastic is gravity fed thereto. At this stage the nozzle tip 22 is closed and the vertical shut-off valve 32 is open. As the screw 24 rotates, material is fed to the chamber 18. Simultaneously, the injection plunger 16 is moved back to the pre-set tail rod stop. The screw is overspun and the vertical shut-off valve 32 is closed locking the material in the chamber 18 at high pressure. To shoot a part, the wedge lock 56 is retracted, drawing the spool 36 away from the tip 22. The injection plunger 16 is driven forwardly causing the material in the chamber 18 to flow past and around the plunger support 46, the plunger or spool 36, through the nozzle 22 and into a mold. After the "shot" is completed, the wedge lock 56 is positioned to close-off the bore 21 and the cycle is repeated.

It should, also be noted that the mode of introduction and types of blowing agents employed can be altered without departing from the present invention.

Having thus described my invention what I claim is:

1. A combined injection molding unit nozzle and shut-off valve comprising:

a body including a central bore having an inner end and a threaded outer end, the inner end open to an injection chamber of the injection molding unit;

a plunger support supported by the central bore, portions of the outer periphery of the plunger support being removed to allow plasticized plastic to flow therepast, the plunger support having a central bore extending longitudinally therethrough and being concentric with the central bore of the body;

a plunger defining a shut-off valve slidingly supported within the plunger support central bore, the plunger including a conical outer end and a planar inner end;

a nozzle tip threadingly engaging the outer end of the body, said tip including a bore concentric with the central bore;

the conical outer end of the plunger having an included angle less than the included angle of the inner wall of the nozzle tip about the concentric bore;

an actuator plunger with an axis passing through the plunger at the inner end thereof;

an inner end of the actuator plunger angled to abut the plunger inner end, the included angle between axis of the actuator plunger and the axis of the plunger being greater than 100 degrees and less than 170 degrees;

a linear actuator affixed to an outer end of the actuator plunger to move the actuator plunger from a first position wherein the conical outer end of the plunger engages and closes the concentric bore in the nozzle tip to a second position wherein the conical outer end of the plunger moves inward to open the concentric bore in the nozzle tip.

2. The combination as defined in claim 1 further comprising:
a heat shield surrounding the body to minimize heat loss.

3. The combination as defined in claim 1, wherein:
the linear actuator is fluid operated.

4. The combination as defined in claim 3 wherein the actuator is air operated.

5. The combination as defined in claim 3 wherein the actuator is hydraulically operated.

6. A two-stage injection molding unit, comprising:
(a) means for plasticizing a quantity of moldable material,
(b) an injection chamber in communication with the means for plasticizing, the moldable material being delivered to the injection chamber after being plasticized,
(c) an injection plunger for urging the plasticized material from the injection chamber to a mold, and
(d) a nozzle in fluid communication with the injection chamber, plasticized moldable material flowing therethrough prior to entering a mold, the nozzle comprising:
(1) a body having a central bore formed therein, and communicating with the injection chamber,
(2) a plunger support mounted in the bore and having a central bore formed therethrough, the plunger support being configured to permit the flow of moldable material therepast,
(3) a plunger, axially slidably mounted in the central bore of the support, the plunger having a conical end formed at a first angle, (4) a nozzle tip mounted to the body and having a central bore in fluid communication with the central bore of the body, the wall of the nozzle tip about the central bore being formed at an angle greater than the first angle of the conical end of the plunger such that when the conical end engages the wall it is pinched thereagainst, and (5) means for moving the plunger into and out of engagement with the nozzle tip wall, the moving means comprising:

(a) the plunger support having an angular bore formed therein which registers with the plunger support central bore, (b) an actuator plunger having a portion thereof slidingly disposed in the angular bore of the plunger support, the actuator plunger being supported in a bore formed in the nozzle body and which registers with the nozzle central bore, the actuator plunger being moved to engage an end of the plunger to urge the plunger into engagement with the wall of the nozzle tip in a first position and being withdrawn from the angular bore in a second position, and (c) means for moving the actuator plunger between the first and second positions.

* * * * *